United States Patent Office 2,730,480
Patented Jan. 10, 1956

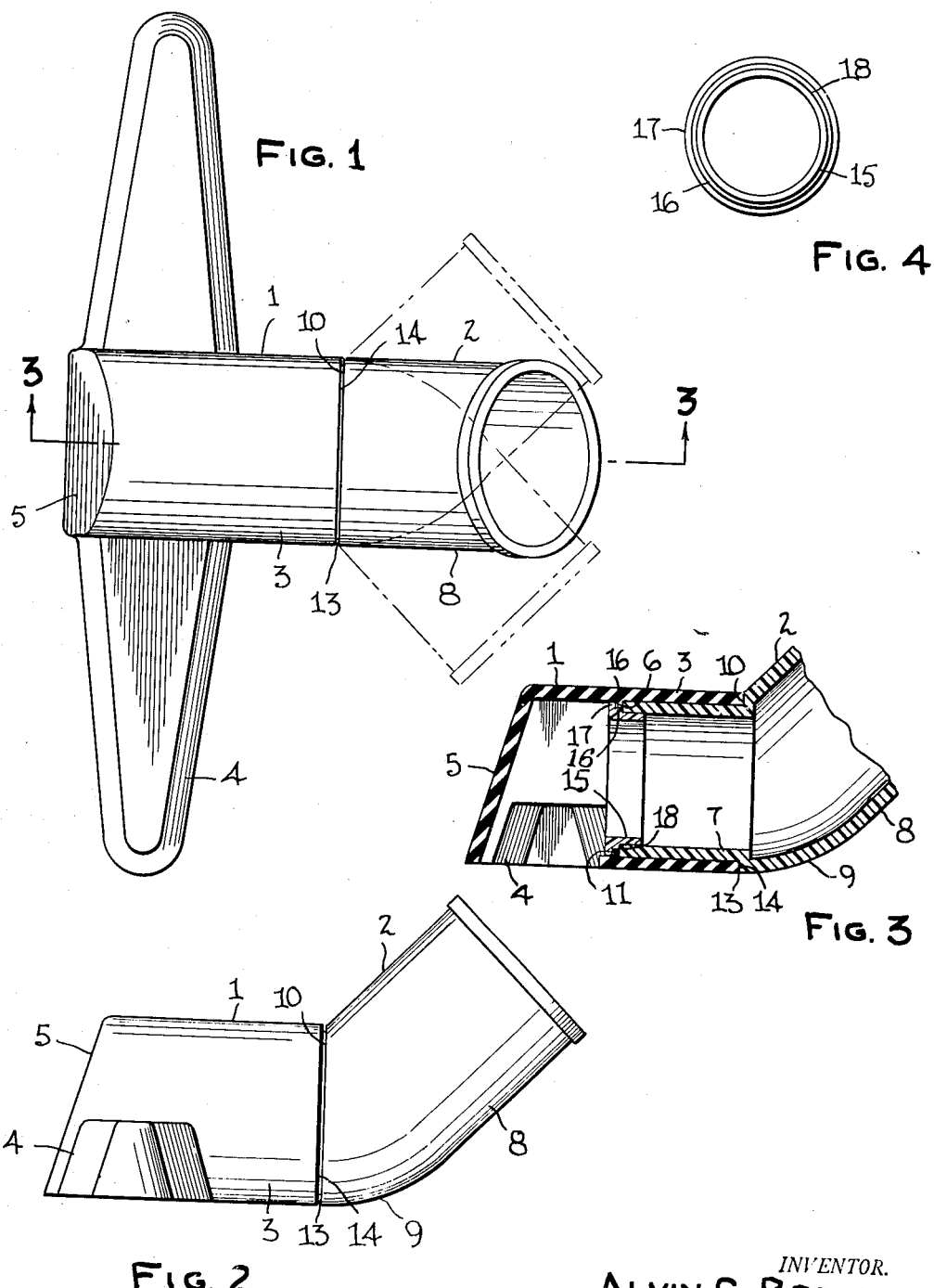

2,730,480

METHOD OF MOUNTING A SWIVEL NOZZLE ON A PIPE

Alvin G. Brown, Euclid, Ohio, assignor to The Electric Sweeper Service Co., Cleveland, Ohio, a corporation of Ohio Application November 23, 1951, Serial No. 257,843

2 Claims. (Cl. 154—116)

This invention relates generally to swivel nozzles, but has reference more particularly to a novel method of and means for securing the nozzle parts in assembled relation, while permitting free rotation of the parts relatively to each other, and at the same time avoiding leakage at the joints between the parts.

It has heretofore been customary, in assembling the parts of a swivel nozzle, to employ various metallic fastenings, such as threaded rings, split rings, screws and the like. These methods and fastening devices have always been objectionable, not only from the standpoint of cost of assembly, but from the standpoint of the cost of the parts and the possibility of the parts becoming loosened and lost.

The present invention has, as its primary object, the provision of a novel method of securing the nozzle parts in assembled relation, while permitting free rotation of the parts relatively to each other, and at the same time avoiding leakage at the joint between the parts.

Another object of the invention is to provide novel means for accomplishing such assembly, which means are relatively low in cost, are relatively inexpensive to insert into the assembly, and cannot become loosened or lost.

Other objects and advantages of my invention will be apparent during the course of the following description. In the accompanying drawings forming a part of this specification and in which like numerals are employed to designate like parts throughout the same, Fig. 1 is a top plan view of a swivel nozzle embodying the invention;

Fig. 2 is a side elevational view of the swivel nozzle;

Fig. 3 is a fragmentary cross-sectional view, taken on the line 3—3 of Fig. 1, and Fig. 4 is an elevational view of one side of the retainer ring.

Referring more particularly to the drawings, the swivel nozzle will be seen to comprise parts generally designated by reference numerals 1 and 2 respectively, the part 2 being swiveled to the part 1 so as to permit rotation of the part 2 to various positions, as indicated by the broken lines in Fig. 1.

The part 1 of the swivel nozzle comprises a cylindrical portion 3, and a nozzle mouth or inlet 4 which extends substantially tangential to the portion 3, and is open at the bottom, the interior of the portion 4 being in communication with the interior of the portion 3. The cylindrical portion 3 of the part 1 of the nozzle is closed, as by an inclined wall 5.

At a point intermediate the ends of the cylindrical portion 3 of the nozzle, the latter is formed to provide a radially-inwardly extending annular rib 6, which serves a purpose to be presently described.

The part 2 of the swivel nozzle comprises a cylindrical portion 7 which has a slide fit in the cylindrical portion 3 of the nozzle, and a generally cylindrical portion 8, the axis of which extends at an angle of approximately 45° to the axis of the cylindrical portion 7. The lower end of the portion 8 is curved, as at 9, so as to provide an annular shoulder 10, the external diameter of which is substantially the same as the external diameter of the cylindrical portion 3 of the nozzle.

The annular rib 6 provides an abutment for the end 11 of the cylindrical portion 7, so that when the end 11 is in abutment with said rib, a slight clearance 13 is provided between the shoulder 10 and end 14 of the cylindrical portion 3, which clearance permits the cylindrical portion 7 to rotate freely about its axis in the cylindrical portion 3 of the nozzle.

In order to maintain the cylindrical portion 7 of the nozzle against axial displacement relatively to the cylindrical portion 3, I have provided an annular retainer member or ring, which, as will be seen in Figs. 3 and 4 of the drawings, comprises a portion 15 having a slide fit in the end of the cylindrical portion 7, a short portion 16 of slightly larger diameter than the portion 15 and of about the same external diameter as the internal diameter of the rib 6, and a portion 17 of approximately the same external diameter as the internal diameter of the cylindrical portion 3 of the nozzle.

The portion 16 of the ring provides a shoulder 18 which is adapted to come into abutment with the end 11 of the cylindrical portion 7, and when this abutment is effected, the distance between the portion 17 of the ring and the end 11 of the cylindrical portion 7 is slightly greater than the width of the rib 6, so that when the ring is permanently affixed to the cylindrical portion 7, the ring will rotate freely in the cylindrical portion 3, but at the same time, the part 2 cannot be withdrawn from the nozzle part 1, due to the engagement of the portion 17 of the ring with the rib 6.

With the parts 1 and 2 of the nozzle in assembled relation, as shown in Fig. 3 the ring may be permanently affixed to the part 2 by coating the portion 15 of the ring with acetone or other adhesive customarily used to cement plastic parts to each other, inserting the ring upwardly through the bottom of the portion 4 and into the end of the cylindrical portion 7 to the position shown in Fig. 3, and after the adhesive has dried, the ring will be permanently joined to the part 2 of the nozzle.

The use of a retainer ring, such as the plastic retainer ring 15—16—17 to secure the nozzle parts against displacement from each other, as well as the method of inserting the retainer ring into the assembly and uniting it to the nozzle part 2 are believed to be unique, due to the highly advantageous results, the elimination of metallic fastening elements, and the general reduction in overall cost, which is accomplished.

The joint between the parts is such that no leakage can occur at the joint, despite the clearances which have been provided, as described.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. The method of rotatably securing a rigid cylindrical element to a cylindrical portion of a rigid nozzle member, comprising the steps of inserting said element coaxially into one end of said cylindrical portion until the end of said element abuts an annular projection in said cylindrical portion, inserting a retaining element into said cylindrical portion from the opposite end thereof until said retaining element abuts said annular projection, and adhesively bonding said retaining element to said cylindrical element to prevent withdrawal thereof from said cylindrical portion.

2. The method of rotatably securing a rigid cylindrical element to a cylindrical portion of a rigid nozzle element to form a swivel nozzle, consisting of the steps of inserting said element coaxially into one end of said cylindrical portion until the end of said element abuts an annular projection in said cylindrical portion, inserting a retaining element into said cylindrical portion from the opposite end thereof until said retaining element abuts said annular projection, withdrawing said cylindrical element until it is just out of contact with said annular projection, and adhesively securing said retaining element to said cylindrical element while maintaining said elements in said stated relationship to said annular projection.

References Cited in the file of this patent

UNITED STATES PATENTS

| | | |
|---|---|---|
| 203,307 | Work | May 7, 1878 |
| 616,032 | Struhs | Dec. 13, 1898 |
| 781,532 | Kenney | Jan. 31, 1905 |
| 1,245,912 | Hedden | Nov. 6, 1917 |
| 2,148,566 | Leon | Feb. 28, 1939 |
| 2,181,136 | Knox | Nov. 28, 1939 |
| 2,280,350 | Pardee | Apr. 21, 1942 |
| 2,570,347 | Humphrey | Oct. 9, 1951 |
| 2,582,031 | Harbison | Jan. 8, 1952 |